Patented June 2, 1942

2,285,095

UNITED STATES PATENT OFFICE 2,285,095

HOT MELT COATING

David A. Rothrock and Harold C. Cheetham, Philadelphia, Pa., assignors to The Resinous Products & Chemical Company, Philadelphia, Pa.

No Drawing. Application April 7, 1939, Serial No. 266,541

3 Claims. (Cl. 117—155)

This invention relates to the art of coating sheet material, and more particularly to the coating of paper by the so-called "hot melt" method, using a synthetic resin made from a dihydric dinuclear hydroaromatic alcohol.

The greatest commercial success that has thus far been achieved in coating paper with materials of a resinous nature has been accomplished with cellulose lacquers. The cellulose derivatives give good film strength, gloss and hardness. They must be applied, however, by means of volatile solvents which cause penetration of the coating into the paper base and require expensive equipment for application and recovery of the solvent. The application of synthetic resins to paper in a molten state without the use of solvents has been proposed but with little practical success. This procedure offers several advantages over the lacquer method and gives a coating that adheres well but does not penetrate the paper. There are, however, but few resinous materials that possess the requisite properties for this method of application. Those which have a suitable melting point and sufficient hardness are too brittle and others which are sufficiently flexible are too soft and tacky or lack one or more of the other qualities of a suitable resin, such as thermal stability, glass, water- and grease-proofness, absence of color, odor, and taste, ability to heat seal, etc.

It has now been found, however, that thermoplastic resins made from dihydric dinuclear hydroaromatic alcohols may be easily applied to paper or other fibrous base material by the hot-melt method and that hard, flexible, glossy, heat sealing, odorless films having good water and grease resistance are thereby obtained. The dihydric dinuclear hydroaromatic alcohol resins may be made by merely heating a dihydric dinuclear hydroaromatic alcohol or by condensing it with an organic polybasic or monobasic acid or by heating a dihydric dinuclear hydroaromatic alcohol with less than an equal weight of a urea formaldehyde-monohydric alcohol condensate until the monohydric alcohol has been displaced as described in copending application Serial No. 263,676, filed March 23, 1939. The dihydric dinuclear hydroaromatic alcohols may be easily prepared by the hydrogenation of dihydric dinuclear phenols at a temperature of 200° C. and a pressure of 150 atmospheres in the presence of an active hydrogenation catalyst such as finely divided nickel. Among the phenols that may thus be converted to dihydric dinuclear hydroaromatic alcohols are dihydroxy diphenyl dimethyl methane, dihydroxy dinaphthyl dimethyl methane, dihydroxy diphenyl, dihydroxy diphenyl methane, dihydroxy diphenyl cyclohexane, etc.

The dihydric dinuclear hydroaromatic alcohols such as are obtained from these phenols are crystalline compounds which on being heated or vacuum distilled form balsam-like resins. In U. S. Patent 2,106,452 it is disclosed that the product obtained by vacuum distilling hydrogenated dihydroxy diphenyl dimethyl methane has a melting point between 130 and 150° C. By repeating the process therein disclosed we have obtained products which although similar in all other respects to the products described in the patent, have had melting points of approximately 50-60° C. which is sufficiently low to permit their use in hot melt processes. It is frequently desirable to use a product having a somewhat higher melting point and in such cases the reaction products of the dihydric dinuclear hydroaromatic alcohols with polybasic organic acids may be used. In such reaction products it is not necessary to use chemically equivalent quantities of alcohol and acid. A molar ratio of one mol of polybasic acid to two or even four mols of dihydric dinuclear hydroaromatic alcohol give suitable products having somewhat higher melting points than the heat treated dihydric dinuclear hydroaromatic alcohols. The same result can be accomplished by heating the dihydric dinuclear hydroaromatic alcohol with less than an equal amount of a urea formaldehyde-lower aliphatic alcohol condensation product under conditions whereby the lower aliphatic alcohol is vaporized. Again the dihydric dinuclear hydroaromatic alcohol may be used in excess over that theoretically needed to replace all the lower aliphatic alcohol in the urea formaldehyde condensation product. As low as 5% urea formaldehyde-lower aliphatic alcohol condensate based on the weight of dihydric dinuclear hydroaromatic alcohol gives good results. Monobasic fatty acids may also be used to modify the dihydric dinuclear hydroaromatic alcohol resins either alone or in conjunction with polybasic acids or urea formaldehyde-lower aliphatic alcohol condensates.

The polybasic acids that may be used in preparing resins suitable for use in the present invention are those commonly used in the preparation of alkyd type resins such as phthalic acid, maleic acid, sebacic acid, adipic acid, and the addition product of rosin and maleic acid. The monobasic acids that may be used include rosin, benzoyl benzoic acid, naphthenic acid, montanic acid, stearic acid, oleic acid, and the acids derived from drying, semi-drying, or non-drying oils such as linseed, tung, Perilla, oiticicia, fish, soy, sunflower, cocoanut, cottonseed, and castor oils. In conjunction with the polybasic acids with or without the monobasic acid modifiers, small amounts of other polyhydric alcohols may also be used, such as glycerol, ethylene glycol, diethylene glycol, mannitol, sorbitol, pentaerythrite, etc.

The urea formaldehyde-lower aliphatic alcohol condensates that may be used may be made by reacting urea and formaldehyde in the presence of a lower aliphatic alcohol solvent and continuously removing the water of reaction as it is formed. The reaction is preferably started in alkaline medium which is then made slightly acid after some condensation has taken place. Preferably also substantially two mols of formaldehyde are used for each mol of urea and the condensation is continued until approximately two mols of water are eliminated. The urea in these resins may be partly replaced by other nitrogenous compounds which form resins with formaldehyde such as thiourea, dicyandiamide, and the amino triazines such as melamine and thio ammeline or their derivatives. Suitable lower aliphatic alcohols for the preparation of these condensates are the readily volatile monohydric alcohols such as ethyl alcohol, butyl alcohol, amyl alcohol, etc. Instead of heating the dihydric dinuclear hydroaromatic alcohol with a preformed urea formaldehyde-lower aliphatic alcohol condensate the dihydric dinuclear hydroaromatic alcohol may be added to the reaction mixture of urea, formaldehyde and lower aliphatic alcohol at the beginning of an intermediate stage of condensation.

The invention also contemplates the use of mixtures of dihydric dinuclear hydroaromatic alcohol resins as above described and their use in conjunction with other film forming compositions such as nitrocellulose, ethyl cellulose, alkyd resins, vinyl resins, acrylic resins, polystyrene, and cellulose acetate, with or without the addition of suitable plasticizers such as dibutyl phthalate, dibutyl sebacate, and tricresyl phosphate. The resins herein described have limited compatibility with waxes such as paraffin, carnauba, beeswax, candelilla wax and montan wax and almost complete compatibility with Japan wax and hydrogenated castor oil. Wherever desired to reduce the viscosity of the melts or to improve the surface slip of the coating these waxes may also be added to the resin.

The following examples illustrate typical resins that may be used in practicing the invention.

*Example 1.*—A mixture of 120 parts by weight of heat treated perhydrodiphenylol propane and 74 parts of phthalic anhydride was heated with stirring at 200° C. for six hours. A hard, brittle, pale straw colored resin which softened at 71–78° C. and had an acid number of 112 was obtained.

*Example 2.*—A mixture of 240 parts of heat treated perhydrodiphenylol propane and 74 parts of phthalic anhydride was heated in the same manner as in Example 1. The resin obtained was similar to that obtained in Example 1 and had a softening point of 80° C. and an acid number of 22.

*Example 3.*—A mixture of 240 parts of heat treated perhydrodiphenylol propane and 49 parts of maleic anhydride was heated as in Example 1. A pale, hard resin which softened at 76–80° C. and had an acid number of 10 was obtained.

*Example 4.*—A mixture of 240 parts of perhydrodiphenylol propane and 133.4 parts of the addition product of rosin and maleic acid was heated for six hours at 200° C. and then for nine hours at 250° C. The resulting resin softened at 73° C. and had an acid number of 35.

*Example 5.*—180 parts of heat treated perhydrodiphenylol propane was heated at 200° C. for six hours with 52 parts of phthalic anhydride and 12.6 parts of stearic acid. The resin had an acid number of 25 and softened at 65° C.

*Example 6.*—25 parts of a 60% butanol solution of a urea formaldehyde-butanol condensation product was heated with 100 parts of perhydrodiphenylol propane at 100–150° C. until substantially all the butanol, including that combined with urea and formaldehyde, had been evolved. The product obtained had a melting point of approximately 72° C.

Each of the above resins becomes quite fluid at 150° C. and may be readily applied as a coating to paper or other base material from the hot roll of a coating machine. Frequently, however, it is desirable to blend these resins with other suitable materials and to illustrate such blends, the following examples are given:

*Example 7.*—A mixture consisting of 6 parts of heat treated perhydro diphenylol propane, 4 parts of candelilla wax, 1 part of ethyl cellulose, was heated to 150° C. and applied to paper. When cooled it formed a hard, flexible, glossy, and tack-free film.

*Example 8.*—A mixture consisting of 75 parts of the resin obtained from Example 2, 9 parts of a wax sold under the designation of "I. G. Wax E," 12 parts of hydrogenated castor oil, 2 parts of ethyl cellulose, and 2 parts of paraffin was heated to 150° C. and coated on paper, and gave a film which was hard, flexible, glossy, greaseproof and waterproof.

*Example 9.*—A mixture consisting of 75 parts of the resin obtained from Example 2, 15 parts of hydrogenated castor oil, 10 parts of "I. G. Wax E," was melted and coated on paper. It gave a glossy, flexible, non-blocking, hard, greaseproof, waterproof coating.

These examples are typical of coatings made in accordance with the present invention which can be used on paper, foil, cloth, sheet metal or any other sheet material. Many other combinations of ingredients, using one or more of the waxes heretofore mentioned, with or without the addition of a cellulose derivative or other film-forming composition, also with or without the addition of plasticizers, may be made. Waxes, cellulose derivatives, and plasticizers are the principal modifying agents that come into consideration, but other modifying agents, such as the esters of the addition product of rosin and maleic acid, the acrylic polymers, heat stable alkyds, terpene phenol resins, terpineol-maleic anhydride resins, vinyl polymers, metallic soaps, dyes, and pigments, have also been successfully used.

Any suitable coating machine adapted for applying hot coatings may be used in practicing the invention. Preferably machines employing heated rolls are used. The thickness of the coat may be varied to suit various requirements of different applications. The gloss and smoothness of the coat may be improved by using smoothing rolls or radiant heaters. Apparatus suitable for this purpose is well known and the present invention requires no special equipment or change in construction.

As is apparent from the foregoing description of the invention, the thermoplastic dihydric dinuclear hydroaromatic alcohol resins may be modified in a variety of ways. It is intended that all such modifications wherein at least 50% by weight of the resin is derived from a dihydric dinuclear hydroaromatic alcohol be included within the term dihydric dinuclear hydroaromatic resin as used in the following claims. Thermoplastic resins containing at least that percentage of material derived from a dihydric dinuclear hydroaromatic alcohol are suitable for practicing the invention.

We claim:

1. Paper having on at least one side thereof a coating comprising a thermoplastic resin made from a dihydric dinuclear hydroaromatic alcohol blended with ethyl cellulose, a wax and a plasticizer.

2. Paper having on at least one side thereof a coating comprising a thermoplastic resin made from a dihydric dinuclear hydroaromatic alcohol blended with a wax and ethyl cellulose.

3. Paper having on at least one side thereof a coating comprising a thermoplastic resin made from a dihydric dinuclear hydroaromatic alcohol blended with a wax.

DAVID A. ROTHROCK.
HAROLD C. CHEETHAM.